US007725308B2

(12) United States Patent
Russell

(10) Patent No.: US 7,725,308 B2
(45) Date of Patent: May 25, 2010

(54) INTERACTIVE TOOL FOR SEMI-AUTOMATIC GENERATION OF A NATURAL LANGUAGE GRAMMAR FROM A DEVICE DESCRIPTOR

(75) Inventor: Dale W. Russell, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 11/422,793

(22) Filed: Jun. 7, 2006

(65) Prior Publication Data
US 2007/0288239 A1 Dec. 13, 2007

(51) Int. Cl.
*G10L 15/18* (2006.01)
(52) U.S. Cl. .......................................... 704/9; 704/257
(58) Field of Classification Search .................... 704/9, 704/257
See application file for complete search history.

(56) References Cited

U.S. PATENT DOCUMENTS

| | | | |
|---|---|---|---|
| 5,995,918 A | 11/1999 | Kendall | |
| 6,178,398 B1 * | 1/2001 | Peterson et al. | 704/232 |
| 6,622,136 B2 * | 9/2003 | Russell | 706/45 |
| 6,629,066 B1 | 9/2003 | Jackson | |
| 6,721,705 B2 * | 4/2004 | Kurganov et al. | 704/270.1 |
| 7,076,431 B2 * | 7/2006 | Kurganov et al. | 704/275 |
| 7,386,455 B2 * | 6/2008 | Kurganov et al. | 704/270.1 |
| 2002/0156616 A1 | 10/2002 | Russell | |
| 2005/0078679 A1 | 4/2005 | Henry et al. | |
| 2005/0097503 A1 | 5/2005 | Zintel et al. | |

OTHER PUBLICATIONS

L. Harris, The English Wizard system, from Linguistic Technology, described in "Effective Use of Relational Databases On The Internet" 1996, Linguistic Technology Corporation, USA.
Lee W. Young, "PCT International Search Report and Written Opinion," WIPO, ISA/US, Commissioner for Patents, Alexandria, VA, USA, Mar. 6, 2008.
Simin Baharlou, "PCT International Preliminary Report on Patentability," The International Bureau of WIPO, Geneva, Switzerland, Dec. 24, 2008.

* cited by examiner

*Primary Examiner*—Susan McFadden

(57) ABSTRACT

A method, system, and tool product for creating a grammar for a natural language dialog system from a device description is provided. The system can include a device descriptor for identifying configuration, interface, object, and attribute information of the device, a speech grammar for identifying one or more rules generated from the device descriptor that are supported by the device, a speech recognition system for invoking rules of the speech grammar, and a processor for facilitating interoperability and development of distributed applications and providing delineated coverage of the one or more rules in view of the device descriptor.

20 Claims, 7 Drawing Sheets

PRIOR-ART

102 — Create a new set of instantiated rules, initially empty.
104 — Open a file of parameterized rules to be instantiated
106 — Create instances of universal grammar rules
108 — Add the universal rules to the new set of instantiated rules.
    For each category of command in the application
        Create a bridging rule to subsume rules for that type of query, where a bridging rule is a rule whose left-hand side is a Domain Object-independent non-terminal relating this rule to a category of command, and whose right-hand side consists of a set of expansions of that non-terminal, where each expansion is a Domain Object-specific instantiation of the category of command.
110 — For each Domain Object in the Device Descriptor
112 — Ask developer whether end users of the system will want to refer to this Domain Object
    1142 — If response is yes
        For each category of object phrases
    1144 —    Make a bridging rule to subsume rules for that type of object phrase
    1146 — Create corresponding object-name and object-name-poss rules, where an object-name-possessive rule specifies the possessive form of the name of an object
    1148 — Ask the developer to supply one or more names for the object, offering the name of the Domain Object as a default.
        For each name entered by the developer, including the default if accepted
            Add a right-hand side to the object-name rule expanding to the entered name
            Add a right-hand side to the object-name-poss rule expanding to the possessive form of the entered name.
        Add the object-name and object-name-poss rules to the new set of instantiated
    1150 — rules For each type of object rule using the Domain Object name, but not requiring developer input
            Retrieve the appropriate template from the list of rule templates
    1152 —    Specialize the retrieved template for this Domain Object
            Add the specialized template to the new set of instantiated rules
        For each category of rule that requires only the name of the Domain Object
            Retrieve the appropriate template from the list of rule templates.

Specialize the retrieved template for this Domain Object
            Add the specialized template to the new set of instantiated rules
            Add a new right-hand side to the query-level bridging rule of this category, expanding to the left-hand side of the specialized rule.

Make bridging rules to subsume rules for attributes of this Domain Object.

FIG. 7

116 — For each Domain Attribute of this Domain Object
　　118 — Ask developer whether end user will want to refer to this Domain Attribute
　　　　120 — If response is yes
　　　　　　1202 — For each type of object attribute rule using the name of this Domain
　　　　　　　　　Attribute and optionally the name of this Domain Object, but not requiring
　　　　　　　　　any developer input.
　　　　　　　　　　Retrieve the appropriate template from the list of rule templates.
　　　　　　1203 — Specialize the retrieved template for this Domain Attribute and
　　　　　　　　　　optional Domain Object
　　　　　　1204 — Add the specialized template to the new set of instantiated rules
　　　　　1206 — If this Domain Attribute is complex (i.e., represents a subsidiary Domain
　　　　　　　　Object)
　　　　　　　　Create rules for relating the subsidiary Domain Object to the Domain
　　　　　　　　　Object containing this Domain Attribute
　　　　　　1208 — For each rule created
　　　　　　　　　Add it to the new set of instantiated rules
　　　　　　　　　Add a new right-hand side to the bridging rule for this Domain
　　　　　　　　　　Object, expanding to the left-hand side of this rule
　　　　　Else (the Domain Attribute is simple)
　　　　1210 — Create rules instantiating the atomic values of this Domain Attribute
　　　　1212 — Add these rules to the new set of instantiated rules
　　　　1213 — Create rules that require the name of this Domain Object and the
　　　　　　　　atomic value of this Domain Attribute
　　　　1214 — For each rule created
　　　　　　　Add it to the new set of instantiated rules
　　　　　　　Add a new right-hand side to the bridging rules for this Domain
　　　　　　　　Object, expanding to the left-hand side of this rule
　　　　Add the bridging rules for the attributes of this Domain Object to the new set of
　　　　　instantiated rules.
1216 — Add the query-level bridging rules to the new set of instantiated rules
　　　　Print the new set of instantiated rules to a file

FIG. 8

INTERACTIVE TOOL FOR SEMI-AUTOMATIC GENERATION OF A NATURAL LANGUAGE GRAMMAR FROM A DEVICE DESCRIPTOR

FIELD OF THE INVENTION

The present invention is related to spoken language dialog systems and, more particularly, to methods of creating grammars for natural language dialog systems.

BACKGROUND

The use of portable electronic devices and mobile communication devices has increased dramatically in recent years. Mobile communication devices are offering more features such as speech recognition, pictures, music, audio, and video. Such features are facilitating the ease by which humans can interact with mobile devices. In particular, the speech communication interface between humans and mobile devices becomes more natural as the mobile devices attempt to learn from their environment and the people within the environment using the portable devices.

For example, Natural Language Dialog systems can include speech recognition which allows a user to speak to a mobile device for communicating a command or a query. Techniques for accomplishing speech recognition are well known in the art. Among known speech recognition techniques are those that use grammars. A grammar is a representation of the language or phrases expected to be used or spoken in a given context. Grammars typically constrain the speech recognizer to a vocabulary that is a subset of the universe of potentially-spoken words; and grammars may include sub-grammars. A grammar rule can then be used to represent the set of "phrases" or combinations of words from one or more grammars or sub-grammars that may be expected in a given context. "Grammar" may also refer generally to a statistical language model (where a model represents phrases), such as those used in language understanding systems.

Speech recognition grammars can predict words which are to be spoken at any point in a spoken command phrase. Essentially, from a speech recognition grammar, a speech recognition system can identify the words which should appear next in a spoken phrase. The use of speech recognition grammar can result in more accurate speech recognition since the list of possible words which can be spoken at any point in a spoken phrase is limited based upon the previously spoken words.

However, one of the most difficult and time-consuming tasks in the developing Natural Language Dialog Systems is creating or adapting pre-existing grammars. This task requires a high degree of linguistic training and expertise. Typically, the most difficult part of this task is beginning; creating an initial set of grammar rules. Normally, grammars are derived from a given training corpus. However, such training corpora are expensive and difficult to obtain, and new corpora must be obtained for each new application. If the target grammar is to contain semantic information, then the training corpus must be annotated for semantics, which requires additional time and expertise. Moreover, extracting an optimal grammar from a given corpus is an unsolved problem.

Existing grammar toolkits allow developers to generate a grammar using various approaches. In one approach, the developer must formulate sample utterances by anticipating the utterances a user may present to the dialog system. Essentially, the developer is presented with a blank slate and told to fill the slate with samples. If the developer fails to anticipate a full user utterance range, the coverage of the resulting grammar is inadequate. In another approach, the developer can refine an existing grammar specific to a system component, though the resulting grammar may be tightly integrated with its result, and cannot be used by other system components. In another method, a grammar can be created from a domain model having access to a large corpus. An interactive tool for semi-automatic creation of a domain has been described in U.S. Pat. No. 6,622,136 and is incorporated herein by reference. The domain model provides a useful, formalized representation of knowledge about the domain of an application that the system is addressing and reflects a particular domain expert's conceptualization of that knowledge.

In general, a user of a mobile device is the person most often using the speech capabilities of the mobile device. Due to limited constraints in processing power and memory, the mobile device may not be able to provide all the resources of a Natural Language Understanding system, including the speech recognition components of the system, such as the grammars, on the mobile device. The mobile device may only be capable of supporting a few default speech grammars which may not adequately provide grammar coverage to the user. In addition, limitations of the device itself may not provide certain features that are available on other mobile devices. For example, certain speech processing aspects may only be available to a higher tier product. The user, and the developer of the speech grammars, may not be aware of the capabilities available to the device.

In many interactive systems, the burden is on the developer to either formulate a grammar from scratch, or to come up with a labeled corpus of sample utterances, both of which require time and expertise. Presently, developers write software for Natural Language Dialog systems without general knowledge of what device will be running the software. Accordingly, developers may not be aware of the capabilities the device can support for a natural language interface. A need therefore exists for opening access to capabilities of a device.

BRIEF DESCRIPTION OF THE DRAWINGS

The features of the system, which are believed to be novel, are set forth with particularity in the appended claims. The embodiments herein can be understood by reference to the following description, taken in conjunction with the accompanying drawings, in the several figures of which like reference numerals identify like elements, and in which:

FIGS. 7 and 8 show pseudo code corresponding to one embodiment of the present invention of the flow diagrams of FIGS. 4-6.

DETAILED DESCRIPTION

Figure 1:
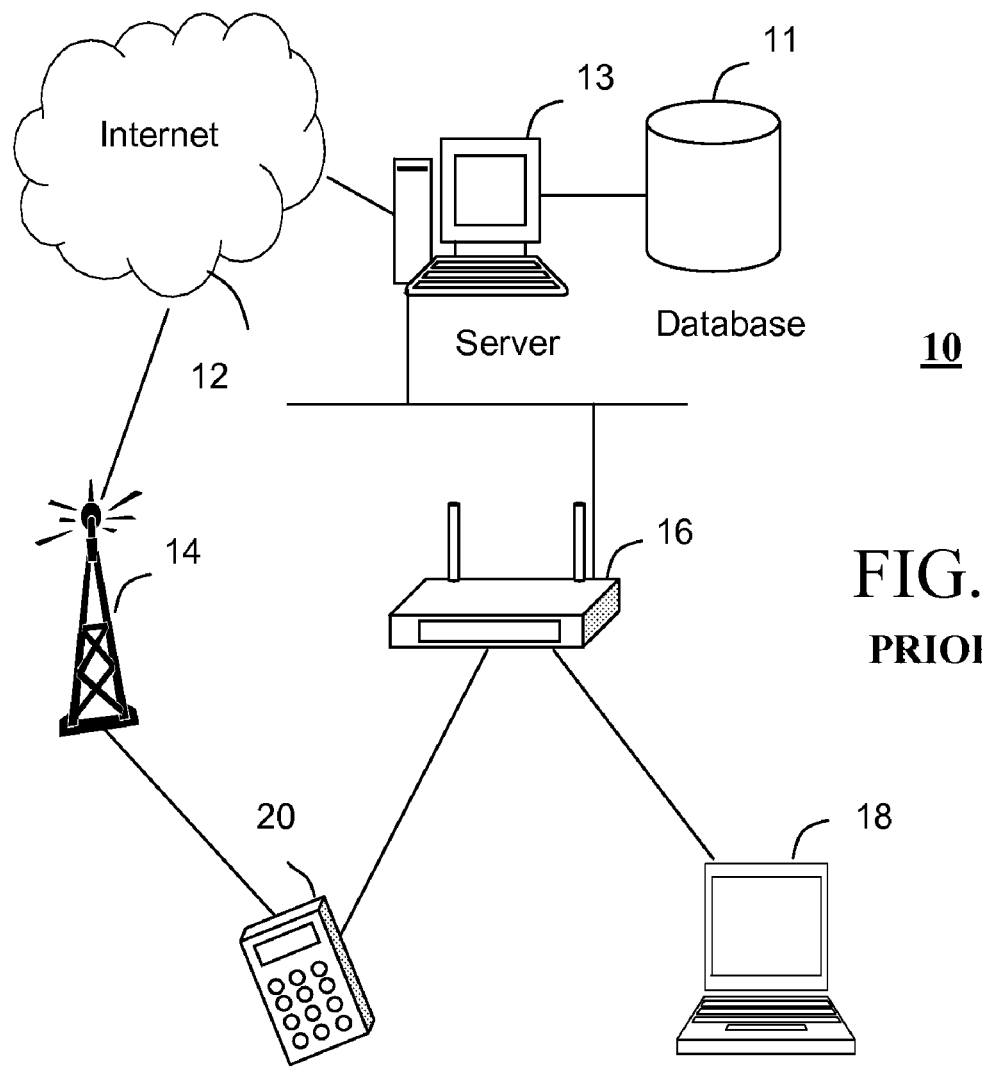
FIG. 1 is a diagram of a mobile communication environment.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, and can be embodied in various forms. Therefore, specific structural and functional details and ordering or inclusion of steps disclosed and claimed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely. The term "processing" can be defined as number of suitable processors, controllers, units, or the like that carry out a pre-programmed or programmed set of instructions.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Embodiments of the invention provide a method, system and tool that allows a developer to interactively create a Natural Language User Interface (NL UI) for a device having a device description. The method includes identifying attributes of a device descriptor for specifying the language by which an end user can interact with the device. The method includes delimiting the coverage of the NL UI to applications the device is capable of supporting. The device description can be in a standardized format, such as Universal Plug and Play (UPnP) or Home Audio Video interoperability (HAVi), or may consist of an Application Programming Interface (API) that specifies the functions of the device that are available to the end user. From the device description, the current invention automatically creates default grammar rules that are suggested to the developer. Then, the developer has the option of accepting, rejecting, augmenting or revising the default rules and testing the grammar coverage using the present invention.

Referring to FIG. 1, a mobile communication environment 10 for coordinated development of a natural grammar is shown. The mobile communication environment 10 can provide wireless connectivity over a radio frequency (RF) communication network or a Wireless Local Area Network (WLAN). In one arrangement, a mobile device 20 can communicate with a base receiver 14 using a standard communication protocol such as CDMA, GSM, or iDEN. The base receiver 14, in turn, can connect the mobile device 20 to the Internet 12 over a packet switched link. The internet 12 can support application services and service layers for providing media or content to the mobile device 20. The mobile device 20 can also connect to other communication devices through the Internet 12 using a wireless communication channel. The mobile device 20 can establish connections with a server 13 on the network and with other mobile devices 18 for exchanging information. The server 13 can have access to a database 11 that is stored locally or remotely and which can contain profile data. The server can also host application services directly, or over the internet 12. In one arrangement, the server 13 can be an information server for entering and retrieving speech grammars.

The mobile device 20 can also connect to the Internet over a WLAN. Wireless Local Area Networks (WLANs) provide wireless access to the mobile communication environment 10 within a local geographical area. WLANs can also complement loading on a cellular system, so as to increase capacity. WLANs are typically composed of a cluster of Access Points (APs) 16 also known as base stations. The mobile communication device 20 can communicate with other WLAN stations such as the laptop 18 within the base station area. In typical WLAN implementations, the physical layer uses a variety of technologies such as 802.11b or 802.11g WLAN technologies. The physical layer may use infrared, frequency hopping spread spectrum in the 2.4 GHz Band, or direct sequence spread spectrum in the 2.4 GHz Band. The mobile device 20 can send and receive data to the server 13 or other remote servers on the mobile communication environment 10. In one example, the mobile device 20 can send and receive vocabulary words, speech grammar, dictionary entries, or other voice related information from a database 14 through the server 13.

Figure 2:
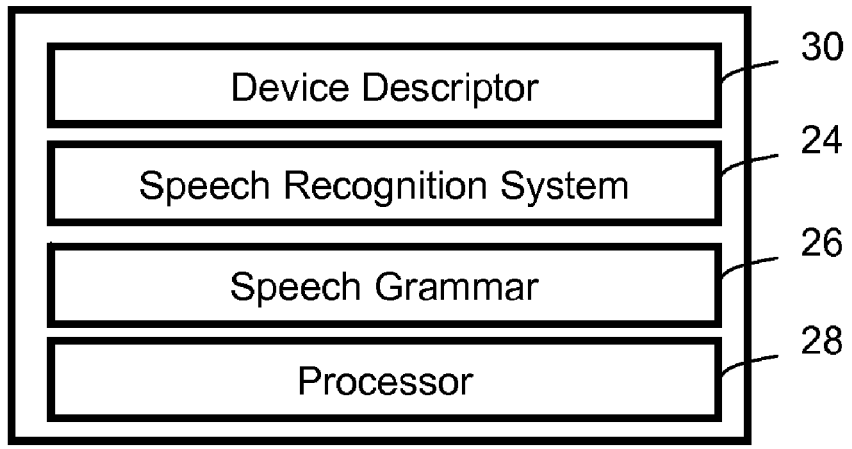
FIG. 2 is a schematic showing speech processing components of a mobile device in accordance with the embodiments of the invention.

Referring to FIG. 2, components of the mobile device 20 in accordance with the embodiments of the invention are shown. The mobile device 20 can be any type of communication device such as a cell phone, a personal digital assistant, a laptop, a notebook, a media player, a music player, a radio, or the like. The term mobile device may also refer to devices capable of functioning without network coverage. For example, a mobile device can also refer to a system untethered to a network such as a standalone computer. As an example, the mobile device 20 can include a device descriptor 30 describing general information about the device, a speech recognition system (SRS) 24 having a local vocabulary, a speech grammar 26, and a processor 28, but is not herein limited to these. The mobile device may or may not have the components on the device; the components may be accessed as distributed elements in a network. The processor 28 can be a microprocessor, a DSP, a microchip, or any other system or device capable of computational processing. The mobile device 20 can include peripheral input and output components such as a microphone and speaker known in the art for capturing voice and playing speech and/or music. The mobile device 20 can also include a dictionary for storing a vocabulary association or one or more phonetic spellings. The device descriptor 30 can be used by the SRS 24 to constrain one or more rules of the speech grammar 26.

In one aspect, the mobile device can delineate grammar coverage. For example, the device descriptor 30 can identify a configuration, interface, object, and attribute information of the device. A developer can generate one or more rules of the speech grammar 26 from the device descriptor, wherein the rules are supported by the device. The speech recognition system 24 can invoke rules of the speech grammar 26, and the processor 28 can facilitate interoperability and development of distributed applications for providing delineated coverage of the one or more rules in view of the device descriptor.

Figure 3:
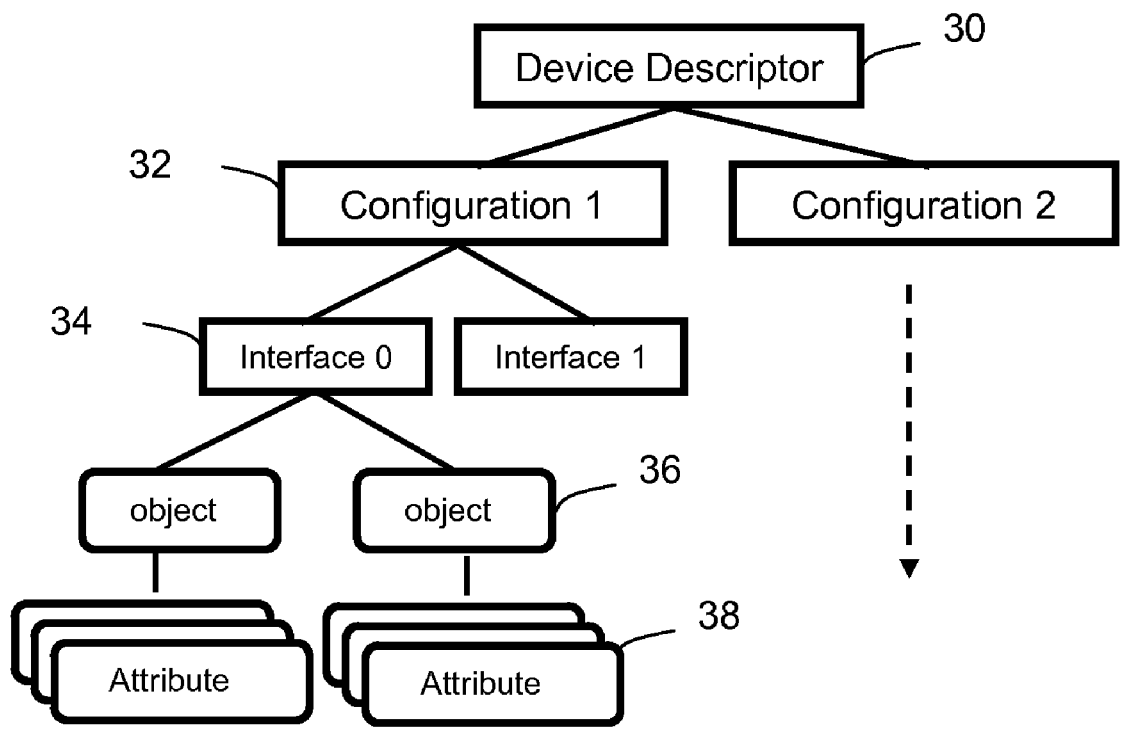
FIG. 3 is a schematic of a device descriptor in accordance with the embodiments of the invention.

Referring to FIG. 3, an exemplary embodiment of the device descriptor 30 is shown. It should be noted that the device descriptor 30 can include more or less than the number of components shown. The device descriptor 30 can include information that applies globally to the device and all of the device configurations. The device descriptor 30 can include one or more configurations 32 and one or more interfaces 34 per configuration. Notably, a configuration 32 provides information about the capabilities of a specific device. Different configurations can be used to change global device settings, such as power consumption and network coverage. In one arrangement, the device configurations can include slots for location awareness, presence info, and geography. The configuration descriptors may also identify the language type supported on the device, such as French, English, Spanish, Hebrew, Mandarin, or the like. Each configuration has one or more interfaces and each interface has one or more domain objects. The interface describes the communication handle for interacting with the device. For example, the interface can describe the conjugation of a language, or the elemental compositions of the language, such as noun and verb phraseology. Each interface can have one or more domain objects 36 having an associated set of attributes 38. Notably, the domain objects 36 provide the grammar coverage of the device. In one aspect, the domain objects 36 describe the level of grammar support available to the device; that is, the grammar coverage. The attributes 38 define specifics of the grammar such as a namelist or itemlist in a rule of the speech grammar.

For example, domain objects can be objects in the real world, as opposed to, say, actions, processes or properties. The domain objects can reside in a UPnP description slot such as a <deviceList> shown below. The device list provides a list of embedded devices accessible from the top-level device, and each <deviceList> can be associated with a <seviceList>, where the <deviceList> specifies the lower-level devices that are acted on by services in the <serviceList>, which in turn describes the services that the top-level device can perform.

<serviceList>
  <service>
    <serviceType>WANCommon-InterfaceConfig:1</serviceType>
    <serviceId>WANCommonInterfaceConfig</serviceID>
    <controlURL>WANCommonInterfaceConfig</controlURL>
    <eventSubURLWANCommonInterfaceConfig</eventSubURL>
    <SCPDURL>/upnp/service/WANCICfg.xml</SCPDURL>
  </service>
</serviceList>
<deviceList>
  <device>
    <deviceType>WANConnection-Device:1</deviceType>
    <friendlyName>Residential Gateway</freindlyName>
    <manufacturer></manufacturer>
    <manufacturerURL></manufacturerURL>
    <modelDescription>Residential Gateway</modelDescription>
    <modelName>Residential Gateway</modelName>
    <modelNumber>1</modelNumber>
    <modelURL></modelURL>
    <serialNumber>0000001</serialNumber>
    <UDN>uuid:upnp-WanConnectionDevice-1 0-e7</UDN>
    <UPC>00000-00001</UPC>

In the above device descriptor example, the device list shows a service component WANCommon-InterfaceConfig followed by a device (in a <deviceList>), WANConnection-Device. The WANConnectionDevice can be a Domain Object in the Domain Model of an application, and its attributes can be automatically extracted from the subfields of this <device>. Alternatively, the construction of a Domain Model can be bypassed, and the <device> can fill the slot of Noun Phrase in the Natural Language Grammar, and its subfields can become the adjectives and other modifiers, according to the known phraseology of English or other natural languages.

Referring back to FIG. 2, the SRS 24 may require advance knowledge of a grammar that it will be asked to listen for. The SRS 24 may be informed of the language that the device supports by querying the device descriptor 30. The SRS 24 can then reference the corresponding speech grammar 26 for this information in the correct language which provides the application context. This advance notice comes in the form of a grammar file that describes the rules and content of the grammar. The grammar file defines the set of rules that govern the valid utterances in the grammar. As an example, a grammar for the reply to the question: "what do you want on your pizza?" might be represented as:

<reply>::=(("I want"|"I'd like")("peppers"|"onions")).

Under this set of rules, all valid replies consists of two parts: 1) either "I want" or "I'd like", followed by 2) either "peppers" or "onions". The rules are a portion of the speech grammar that can be added to a second speech grammar to expand a grammar coverage for the second speech grammar. The grammar file can be created by a developer of an application resident on the mobile device 20 or the server 13. The grammar file can be updated to include new rules and new words based on domain objects and their attributes as described by the device descriptor 22. For example, with regard to presence information, the device descriptor 22 identifies speech grammars available to the device 20 when the device is in a certain coverage area. For instance, the speech grammar forms the basis of what the user can say to the device in order to interact with the device. The device descriptor can update the coverage based on presence information such as location or subscription to service. The SRS 22 can refer to the device descriptor to determine what speech grammars are instantiated for providing grammar coverage. The device descriptor provides interoperability for communicating coverage with other devices in the mobile communication environment 10. This aspect of the invention provides coordinated delivery of natural language grammars and establishes the coverage of that system.

The device descriptor 30 contains information regarding an application domain but does not necessarily reflect a complete conceptualization of that information. The device descriptor 30 may be in the form of a relational database or an Application Programming Interface (API). Accordingly, the device descriptor 30 may contain functional elements, such as what are referred to as "bridging" tables or rules in a relational database to facilitate database look-up. Typically, relational databases include attributes that have atomic values, such as string or integer, and requiring arbitrary identifiers to relate one object to another. Thus, the device descriptor 30 may include attributes with arbitrary nesting of complex values of objects, where each object has another object as the value of one of its attributes. The device descriptor 30 includes whatever information and capabilities are available on the device. From this device descriptor 30, a default set of domain objects can be extracted, and for each object, a default set of attributes also can be extracted.

In one aspect, the configuration 32 of the device descriptor 30 specifies whether the mobile device 20 works from a domain model, or works directly from the device descriptor 30. For example, in the former, (Configuration 2 of FIG. 3) using a relational database as an input, each database table can be converted into a default domain object with the name of the particular table as the default name of the object. Initially, for each table, each column can be a default domain attribute with the name of the column as the default name of the attribute. Correspondingly, for an API input, the default object names can be extracted from the names of function arguments and, the names of attributes are extracted from the functions themselves. In the latter (Configuration 2 of FIG. 3), domain objects and attributes can be generated from the interface 34. For example, the interface 34 can specify existing functions and methods of an API the mobile device supports. In one embodiment, the domain objects 36 and attributes 38 are listed directly in the device descriptor. As an example, the device descriptor can be of a Universal Plug and Play (UPnP) format or a Home Audio Video interoperability (HAVi) format.

UPnP is an architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. UPnP is a distributed, open networking architecture that leverages TCP/IP and the Web technologies to enable seamless proximity networking in addition to control and data transfer among networked devices in the home, office, and public spaces.

UPnP provides for discovery for devices having a breadth of device categories from a wide range of vendors. This means a device can dynamically join a network, obtain an IP address, convey its capabilities, and learn about the presence and capabilities of other devices. UPnP uses common protocols instead of device drivers. UPnP networking is media independent. UPnP devices can be implemented using any programming language, and on any operating system. UPnP does not specify or constrain the design of an API for applications running on control points; OS vendors may create APIs that suit their customer's needs. UPnP enables vendor control over device UI and interaction using the browser as well as conventional application programmatic control.

As another example, Home Audio Video interoperability (HAVi) defines an architecture for facilitating interoperability and development of distributed applications on home networks. HAVi is intended for implementation on consumer electronics devices and computing devices. The HAVi specification is a consumer electronics (CE) industry standard that can ensure that digital audio and video devices that conform to this standard, regardless of manufacturer, may have complete interoperability when connected via a network in the consumer's home. For example, a HAVi compliant network can be connected to an Ethernet compliant network. HAVi devices can have access to the Internet through this Ethernet network. A HAVi device could use a web browser to connect with an HTML application through a HAVi web proxy, or an HTTP-based server application gateway.

Given a newly encountered device which includes a device description, embodiments of the current invention allows a developer to interactively create a Natural Language Interface (NL UI). For example, the UPnP and HAVi format can specify the capabilities of the device and the language by which the end user of the device can interact with the device, and delimit coverage of the NL UI. Applications using such Natural Language Dialog Systems primarily fall into one of two categories: query or, command and control. For each of these, it is possible to anticipate the linguistic form of many user utterances. These anticipated linguistic forms can be expressed in a domain-independent formulation called a template grammar.

A template grammar can be supplied to the grammar developer based on the capabilities of the device specified in the device descriptor. The template grammar can then be specialized for a given application domain according to an algorithm that operates on one object of the domain model at a time and on one attribute at a time for each object. Thus, for each object and for each attribute, the preferred embodiment tool retrieves relevant rules from the template grammar and specializes the retrieved rules for the given object and/or attribute based on the capabilities of the device to generate a set of default rules. The default rules are then presented to the developer. The developer can accept, reject, augment or revise the default rules, and test the grammar coverage.

Figure 4:
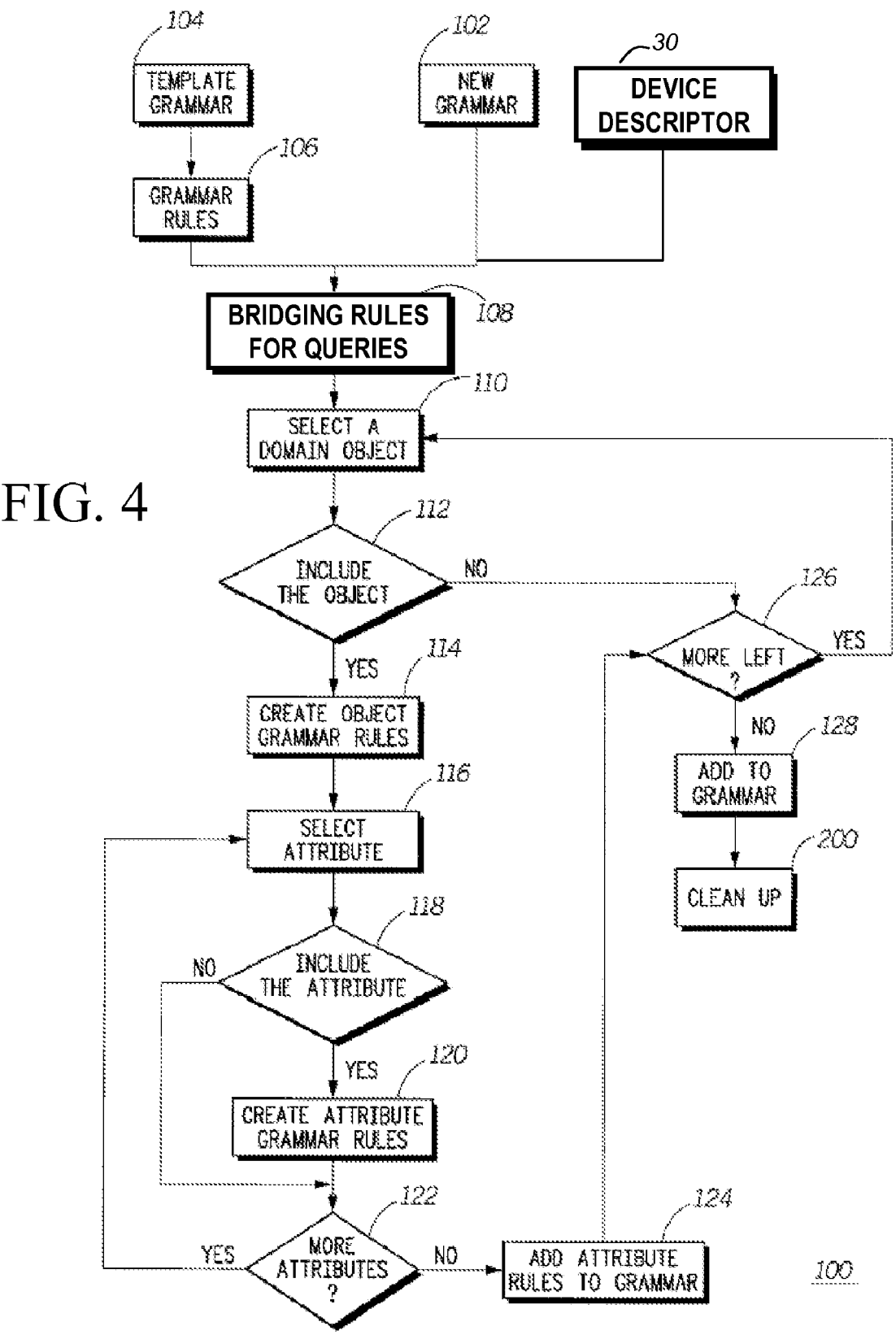
FIG. 4 is a flow diagram describing the generation of a new grammar from a grammar template in accordance with the embodiments of the invention.

FIG. 4 is a flow diagram of a method of creating a grammar from a device descriptor. First, in step 102, a new grammar is created. Initially, the new grammar is empty. In step 103, the device descriptor (30) is opened for acquiring information concerning the configuration (32) and interface (34) access to the device. Notably, the device descriptor can disclose available objects (36) having attributes (38) that can be included in the new grammar. Then, in step 104, a template grammar is opened. The template grammar includes parameterized general purpose rules based on the device descriptor (30) that are to be instantiated. In step 106, instances are created from general purpose grammar rules and the general purpose grammar rule instances are added to the new grammar. In step 108, a bridging rule is created for each of the broad category of queries in the new grammar. Each bridging rule subsumes the rules for that type of query. The bridging rules each include domain object independent non-terminals on the left-hand side relating the rule to a broad category of rules. The right-hand side is a set of expansions of the non-terminal on the left-hand side. These expansions are each a domain object-specific substantiation of the broad category.

An example of a rule template applied to a domain object is shown below.

Rule Template:
    <object_wh>::=
    ((what <object_name>)
    |(which <object_name>)
    |(which of <det><object_name>)).

Domain Object: Airplane

Default Instantiated Rule:
    <airplane_wh>::=
    ((what <airplane_name>)
    |(which <airplane_name>)
    |(which of <det><airplane_name>)).

Continuing, in step 110, the domain objects listed in the device descriptor are selected one at a time and in step 112, the developer is allowed to decide whether to include the selected domain object or not. If the developer decides to include the domain object, then in step 114, object grammar rules are created for that domain object as is described more fully herein below with reference to FIG. 5. In step 116, attributes from included domain objects are presented to the developer, one attribute at a time and in step 118, the developer can decide whether or not to include the selected attributes in the grammar. If the developer does decide to include the attributes, then, in step 120, attribute grammar rules are created for the attribute as described in detail herein below with reference to FIG. 6. In step 122, the object is checked to determine whether any attributes remain as yet unselected and, if so, returning to step 116, attribute selection continues. In step 122, when all of the device attributes have been selected and either included or excluded, then in step 124, the bridging rules for included attributes are added to the grammar. In step 126, a check is made of whether additional domain objects remain unselected. If additional domain objects remain, then, returning to step 110, the next domain object is selected. If, however, no additional objects listed in the device descriptor remain, then in step 128, the query level bridging rules are added to the new grammar. Finally, in cleanup step 200, the newly-created grammar is finalized as inconsistencies are detected and repaired.

Thus, an inexperienced developer, accepting all of the default specialized template rules receives a fully functional grammar, although coverage may be less than optimal. Alternatively, a more experienced developer with some knowledge of the device domain may accept some proposed grammar rules, reject others, add new expansions for given rules and modify existing expansions.

Accordingly, one embodiment of the invention is a tool that creates nested structures with optional developer interaction based on the device descriptor. The tool does not require inclusion of artifacts of arbitrary identifiers. Advantageously, the preferred embodiment tool assigns default names drawn from the names of objects and attributes specified by the device descriptor and, then, allows renaming of objects and attributes from these default names. Thus, a default domain model may be created directly from the device descriptor, or alternatively, a domain model itself created from a domain specification such as a relational database or API. Then, optionally, a developer with any degree of expertise may interact with the system to further refine and develop the speech grammar using the capabilities of the device as desired.

Figure 5:
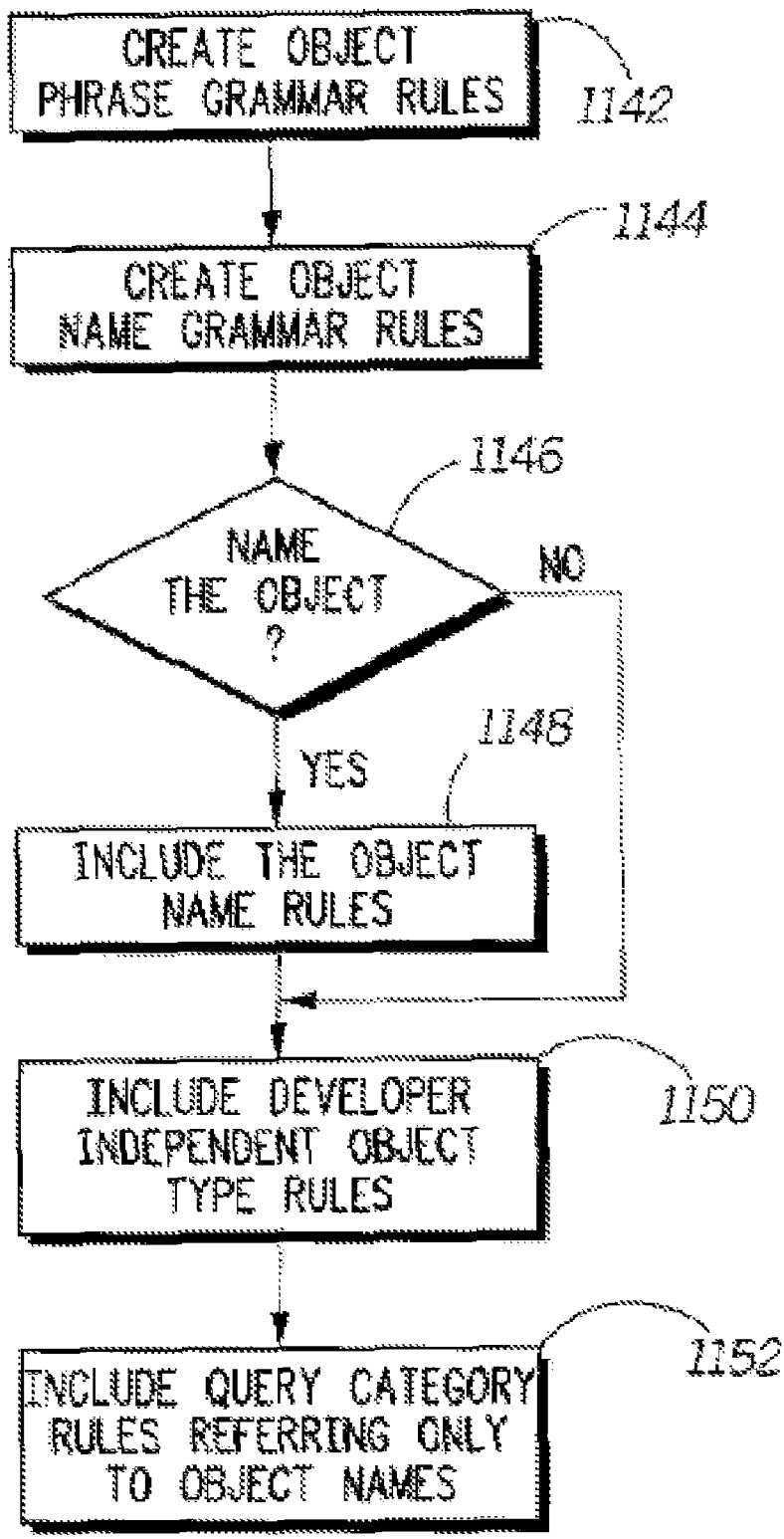
FIG. 5 is a flow diagram describing the steps in creating object grammar rules in accordance with the embodiments of the invention.

As indicated hereinabove, FIG. 5 is a flow diagram describing the step 114 of creating object grammar rules. First, in step 1142, an object phrase grammar rule is created for each category of object phrases. The object phrase grammar rules are each a bridging rule that subsumes rules for that particular type of object phrase. In step 1144, object-name rules and object-name-poss grammar rules are created, where the object-name-poss rule specifies the possessive form of the name of the particular object. In step 1146, the developer is allowed to select object names. The developer is presented with the name of the domain object as the default name for the object and allowed to provide other object names. In step 1148, each name selected by the developer, including the default name, if selected, is included in the object. A right-hand side is added to the object-name rule, expanding to include each selected name and, correspondingly, a right-hand side is also added to the object-name-poss rule, expanding to include the possessive form of the entered name. Then, both the object-name rule and the object-name-poss rule are added to the new grammar.

Continuing, in step 1150, developer-independent specialized rules are added to the new grammar. So, for each type of object rule using the domain object name, but that does not require developer input, appropriate parameterized rules are retrieved from the template grammar. The retrieved rules are specialized for the particular domain object specified by the device descriptor and, then, added to the new grammar. Finally, in step 1152, entry level rules that require only domain object names are added to the new grammar. So, the appropriate parameterized rule is retrieved for the new grammar and specialized for the particular domain object. The specialized rule is added to the new grammar. A new right-hand side is added to the query level rule and the left-hand side is expanded in the specialized rule. Domain object processing continues in step 116, as device attributes are selected for the main object, selectively included in step 118 and grammar rules are created for the included attributes in step 120.

Figure 6:
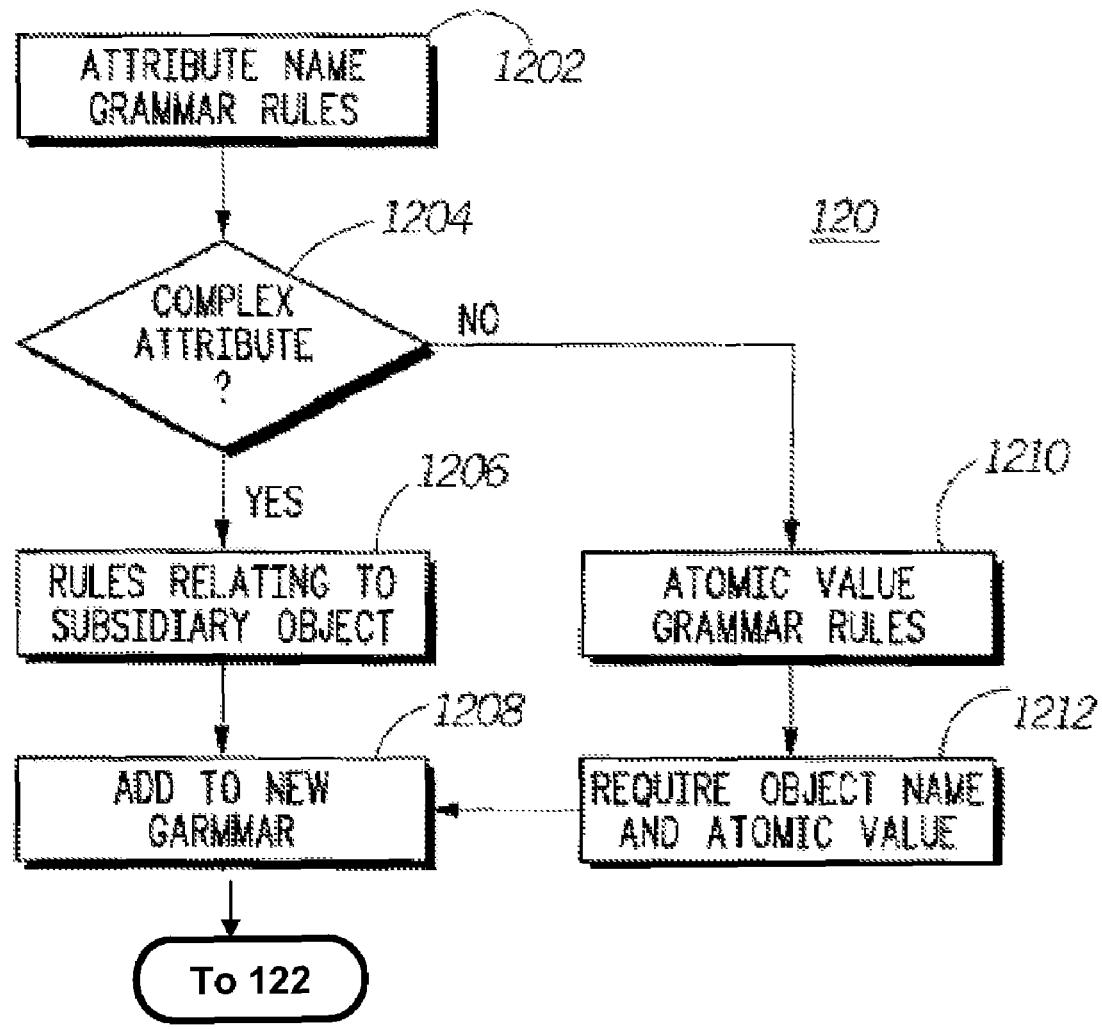
FIG. 6 is a flow diagram showing the steps of creating attribute grammar rules in accordance with the embodiments of the invention.

FIG. 6 is a flow diagram showing the step 120 of creating attribute grammar rules. First, in step 1202, grammar rules are generated using the named device attribute and, optionally, the name of the domain object specified by the device descriptor. Then, the generated grammar rules are added to the new grammar. Next, in step 1204, the device attribute is checked to determine if it is complex; that is, it represents a subsidiary of a domain object. If the domain object is complex, then in step 1206, grammar rules are created relating the subsidiary domain object to the domain object. In step 1208, the newly created grammar rule is added to the new grammar and, a new right-hand side is added to the bridging rule for the complex domain object, correspondingly, expanding to the left-hand side for this newly-created rule.

Otherwise, if in step 1206 the domain object is not complex, then in step 1210, grammar rules are created for atomic values of the simple domain attribute. These newly created atomic value grammar rules are then added to the new grammar and, in step 1212, grammar rules are created that require the name of the simple domain object and the atomic value of the device attribute. In step 1214, the newly created grammar rule is added to the new grammar and the new right-hand side is added to the bridging rule for the simple domain object as well as, correspondingly, expanding the right-hand side of the bridging rule. Once bridging rules are created for domain object attributes and included in the new grammar and query level bridging rules have been created and included in the new grammar in step 128, the grammar is checked in step 200 for inconsistencies, removing any that are found.

FIGS. 7 and 8 show pseudo code for an embodiment corresponding to the flow charts of FIGS. 4-6.

As described herein above, a template grammar is a set of general purpose parameterized rules or template rules. A template rule is a grammar rule which is parameterized for domain objects and attributes. That is, some or all non-terminal or terminal categories in a template rule may be abstractions over objects or attributes. These abstract categories are instantiated for particular objects and attributes, thus creating an actual grammar rule. The following is an example of a template rule:

<Object_adj_Attribute>::=
((<Attribute_value>:Attribute1){(VALUE(APPEND Attribute $Attribute1))}).

Working with an airline domain, for example, one way that this template rule might be specialized is with Object instantiated as "flight", and Attribute as "airline". Then, the specialized rule would then be:

<flight_adj_airline>::=
(((<airline_value>:airline1){(VALUE(APPEND airline $airline1))})

The <airline_value> expands to, for example, "Delta" and "United," which, along with other rules, allows a user to make requests such as: "show me the Delta flights" or "I want to get a United flight" and the like. During the course of creating an application grammar, a single template rule may be used many times, specialized in different ways. The template rules represent very general language patterns, which occur over and over again. The template rule above indicates that an attribute may be instantiated as an adjective that is used to modify a noun representing an object having that attribute. There are many such patterns, each encoded in a template rule.

An appropriate interface, such as a graphical user interface (GUI), allows developers to choose an object or attribute from the device descriptor and work on grammar rules related to that selected object or attribute. When an object or attribute is selected, any grammar rules already created by the developer are displayed. Otherwise, if no rules have yet been created for a selected object or attribute, a default set of rules is created and displayed. The interface also displays the current state of completion of the grammar rules. At any time, the developer may further refine previously created rules.

Accordingly, the present invention automatically provides grammar rules to a developer. The developer may accept, reject, augment or revise the default rules as desired. Once the developer is satisfied with the grammar, it is tested and any defects corrected. The resulting grammar is automatically generated without requiring any particular level of expertise on the part of the developer.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed is:

1. A method of creating a grammar for a natural language dialog system from a descriptor of a device, the method comprising:
creating, on a computing device, instances of universal grammar rules for the natural-language dialog as a new grammar based on the device descriptor, the universal grammar rules including a plurality of selected domain objects, each of the selected domain objects including one or more attributes associated with the device, wherein the creating comprises:
creating a bridging rule for each broad category of queries in the universal grammar rules;
selectively including domain objects as domain objects in the new grammar;
creating bridging rules for domain object attributes; and
selectively including attributes in the new grammar;
wherein the device descriptor specifies functions of the device that are available to an end user through the domain objects for implementing the grammar.

2. The method of claim 1 wherein the device descriptor is one of: a Universal Plug and Play format and a Home Audio Video interoperability format.

3. The method of claim 1 wherein the device descriptor comprises an Application Programming Interface to specify one or more capabilities of the device.

4. The method of claim 1 wherein the domain objects coordinate a delineation of grammar coverage.

5. The method of claim 1 wherein an attribute of a domain object specifies one or more grammars available for download.

6. The method of claim 5 wherein the domain objects specify pervasive peer-to-peer network connectivity of intelligent appliances.

7. The method of claim 1 wherein the domain objects specify data transfer among networked devices and an interoperability of one or more network connections.

8. The method of claim 1 wherein a domain object allows the device to dynamically join a network, obtain an IP address, convey its capabilities, and learn about presence and capabilities of other devices.

9. The method of claim 1 wherein creating the new grammar comprises:
creating an initially empty new grammar;
opening a template grammar, the template grammar including parameterized universal rules to be instantiated;
creating instances of the universal grammar rules; and
adding instantiated universal rules to the new grammar.

10. The method of claim 1 wherein selectively including domain objects comprises:
selecting an object from the plurality of domain objects; and
presenting the selected object to a developer, the developer deciding whether the selected object is included in the new grammar.

11. The method of claim 1 wherein each bridging rule includes a device-object-independent non-terminal in a left-hand side and a set of expansions of the non-terminal in a right-hand side.

12. The method of claim 11 wherein each of the set of expansions is a device-specific instantiation of the broad category of queries.

13. The method of claim 11 wherein the device-object-independent non-terminal relates the bridging rule to a broad category of rules.

14. The method of claim 10 wherein if the developer decides that the selected object should be included in the new grammar, then the method further comprises:
creating a bridging rule for each broad category of object phrases;
creating an object name grammar rule for each created bridging rule;
allowing the developer to select names for the included object; and
adding entries in the new grammar for each selected name.

15. The method of claim 14 further comprising:
specializing object rules not requiring developer input; and
specializing query rules requiring only the name of a domain object.

16. The method of claim 1 wherein a developer selects whether an attribute is included in the new grammar.

17. The method of claim 16 wherein if the developer selects an attribute for inclusion, then the method further comprises:
including attribute name grammar rules naming the attribute; and identifying whether the named attribute is complex or simple.

18. The method of claim 17 wherein if the named attribute is identified as complex, then the method further comprises:
creating grammar rules relating a domain object including the complex attribute to a subsidiary domain object; and
adding the created relating grammar rules to the new grammar.

19. The method of claim 17 wherein if the named attribute is identified as simple, then the method further comprises:
creating grammar rules for atomic values of the simple attribute;
adding the created atomic value grammar rules to the new grammar;
creating grammar rules requiring a name of a domain object including the simple attribute and an atomic value of the simple attribute; and
adding the created grammar rules to the new grammar.

20. A tool for the coordinated development of a natural language grammar, the tool comprising:
means for forming a new natural-language grammar from a device descriptor, wherein the new grammar includes instances of general purpose grammar rules supported by a device having the device descriptor, the instances of general purpose rules invoked through a plurality of domain objects, each of the domain objects including one or more attributes, wherein the means for forming comprise:
means for creating bridging rules for query categories and attributes;
means for selecting domain objects included as domain objects in the new grammar; and
means for selecting attributes included in the new grammar;
wherein the device descriptor specifies functions of the device that are available through the domain objects for implementing the grammar.

* * * * *

UNITED STATES PATENT AND TRADEMARK OFFICE
CERTIFICATE OF CORRECTION

| | | |
|---|---|---|
| PATENT NO. | : 7,725,308 B2 | Page 1 of 1 |
| APPLICATION NO. | : 11/422793 | |
| DATED | : May 25, 2010 | |
| INVENTOR(S) | : Russell | |

It is certified that error appears in the above-identified patent and that said Letters Patent is hereby corrected as shown below:

IN THE SPECIFICATION

In Column 5, Line 40, delete "<seviceList>," and insert -- <serviceList>, -- therefor.

In Column 5, Line 48, delete "ID>" and insert -- Id>, --, therefor.

In Column 5, Line 62, delete "</freindlyName>" and insert -- </friendlyName> --, therefor.

In Column 6, Line 4, delete "1. . .0-e7</" and insert -- 1_0-e7c</ --, therefor.

Signed and Sealed this
Fifth Day of June, 2012

David J. Kappos
*Director of the United States Patent and Trademark Office*